United States Patent
Zhang et al.

(10) Patent No.: US 12,291,460 B1
(45) Date of Patent: May 6, 2025

(54) REACTION SYSTEM FOR PREPARING SODA ASH

(71) Applicant: NANJING INSTITUTE OF MICROINTERFACE TECHNOLOGY CO., LTD, Jiangsu (CN)

(72) Inventors: Zhibing Zhang, Jiangsu (CN); Lei Li, Jiangsu (CN); Haining Sun, Jiangsu (CN); Zheng Zhou, Jiangsu (CN); Fangyuan Ding, Jiangsu (CN); Huimin Qin, Jiangsu (CN); Qingdong Zhu, Jiangsu (CN); Quan Lu, Jiangsu (CN); Xiabing Li, Jiangsu (CN)

(73) Assignee: NANJING INSTITUTE OF MICROINTERFACE TECHNOLOGY CO., LTD, Jiangsu (CN)

( * ) Notice: Subject to any disclaimer, the term of this patent is extended or adjusted under 35 U.S.C. 154(b) by 0 days.

(21) Appl. No.: 18/717,873

(22) PCT Filed: Jul. 28, 2022

(86) PCT No.: PCT/CN2022/108419
§ 371 (c)(1),
(2) Date: Jun. 7, 2024

(87) PCT Pub. No.: WO2024/020906
PCT Pub. Date: Feb. 1, 2024

(30) Foreign Application Priority Data

Jul. 27, 2022 (CN) .......................... 202210889819.2

(51) Int. Cl.
*C01D 7/18* (2006.01)
*B01J 10/00* (2006.01)
*B01J 19/24* (2006.01)

(52) U.S. Cl.
CPC .............. *C01D 7/18* (2013.01); *B01J 10/002* (2013.01); *B01J 19/2465* (2013.01); *B01J 2219/00166* (2013.01); *B01J 2219/0077* (2013.01)

(58) Field of Classification Search
CPC .... B01J 10/002; B01J 19/2465; B01J 19/245; C01D 78/18
See application file for complete search history.

(56) References Cited

FOREIGN PATENT DOCUMENTS

| CN | 113666395 A | 11/2021 |
|---|---|---|
| CN | 114471404 | 5/2022 |

OTHER PUBLICATIONS

Perry's Chemical Engineers' Handbook, Sixth Edition, R.H. Perry et al., pp. 18-8, Chemical Industry Press, Aug. 31, 1993.

*Primary Examiner* — Lessanework Seifu
(74) *Attorney, Agent, or Firm* — Chun LANWAY IPR SERVICES (57) ABSTRACT

A reaction system for preparing soda ash and a reaction method are provided in the present invention. The reaction system includes: a carbonization tower, a reaction crystallization tower, and a first micro-interface unit. A material outlet is arranged at the bottom of the carbonization tower, and the material outlet is connected to the reaction crystallization tower. The first micro-interface unit includes a first micro-interface generator and a second micro-interface generator, the first micro-interface generator is arranged below the liquid level in the carbonization tower, the second micro-interface generator is arranged above the first micro-interface generator, and a connecting pipe is arranged between the second micro-interface generator and the first micro-interface generator. The reaction system for preparing soda ash may effectively improve the reaction efficiency of raw materials and the utilization rate of carbon dioxide while reducing the input pressure of carbon dioxide, thereby effectively reducing energy consumption.

15 Claims, 4 Drawing Sheets

REACTION SYSTEM FOR PREPARING SODA ASH

FIELD OF THE INVENTION

The present invention relates to the technical field of soda ash preparation, and in particular to a reaction system for preparing soda ash and a reaction method.

BACKGROUND OF THE INVENTION

The chemical principle of "Hou's Soda Ash Production process 1.0" mainly includes the following three chemical reaction steps:

$$NH_3 + H_2O + CO_2 = NH_4HCO_3; \quad (1)$$

$$NH_4HCO_3 + NaCl = NH_4Cl + NaHCO_3\downarrow; \quad (2)$$

$$2NaHCO_3 = Na_2CO_3 + CO_2\uparrow + H_2O \text{(thermal decomposition).} \quad (3)$$

Among the above three reaction steps, the two reaction steps (1) and (2) are conducted in the carbonization reactor (commonly known as the carbonization tower), while the reaction step (3) is conducted in the calcining tower. Compared with the "Solvay Soda Ash Production process", the "Hou's Soda Ash Production process 1.0" is a joint production of an ammonia plant and an alkali plant. The ammonia plant provides the ammonia and carbon dioxide raw materials needed for the reaction to the alkali plant. The reaction not only produces $NaHCO_3$, the precursor compound of the target product $Na_2CO_3$, but also simultaneously produces the ammonium chloride which can be recycled and used as chemical products or fertilizers, instead of producing a large amount of solid waste $CaCl_2$) produced in the "Solvay Soda Ash Production Process", thereby improving atom economy and significantly increase the value of the production process.

However, under the global trend of energy conservation, carbon reduction and green development, "Hou's Soda Ash Production process 1.0" is facing the following problems:

First, in terms of raw materials, the synthetic ammonia raw material in "Hou's Soda Ash Production process 1.0" mainly comes from coal-based synthetic ammonia, which is temporarily called "gray ammonia". Most of various energy sources used in its production process are fossil energy rather than renewable green energy. The raw material $CO_2$ in "Hou's Soda Ash Production process 1.0" comes from high-concentration $CO_2$ (concentration 85%-90%) obtained from the synthetic ammonia gas production and conversion section, rather than low-concentration flue gas $CO_2$ released by other production processes. The former is used in the production process of the "Hou's Soda Ash Production process 1.0", and the comprehensive carbon balance of the entire production process is still a high-carbon production process.

Second, in terms of process operation, the carbonization reactor (carbonization tower) is about 28 meters high, and its liquid level is about 24-26 meters. In order to improve the reaction efficiency, the $CO_2$ as raw material must be feed from the bottom of the tower and distributed, then bubbles rising from the bottom to top react with the liquid phase ammonia flowing from the top to down. Therefore, even if the top of the carbonization tower is operated at normal pressure, the outlet pressure of the corresponding $CO_2$ compressor configuration should be at least about 0.45 MPaG, which undoubtedly requires higher electrical power consumption. According to the reaction equation (1), in order to make the reaction proceed faster and to make the $NH_3$ be converted by the reaction as much as possible, a proper excess of $CO_2$ is generally allowed in the process ingredients. Due to the low reaction efficiency of the "Hou's Soda Ash Production process 1.0" in the carbonization tower, it is difficult for the $CO_2$ bubbles to react completely in one pass from bottom to top. Eventually, the $CO_2$ bubbles will gather at the top of the carbonization tower and be mixed with part of the ammonia gas and be discharged out of the carbonization tower. However, the current process does not recover this part of $CO_2$ and recycle it. Instead, it enters the post-processing system and is emptied into the atmosphere, which results in a waste of raw material $CO_2$.

In view of this, the present invention is proposed.

SUMMARY OF THE INVENTION

A first objective of the present invention is to provide a reaction system for preparing soda ash. The reaction system combines micro-interface technology into the soda ash preparation process, effectively improves the reaction efficiency of raw materials and the utilization rate of carbon dioxide, and simultaneously reduces the input pressure of carbon dioxide and reduces energy consumption.

A second objective of the present invention is to provide a reaction method using the above reaction system. The method is simple to operate, which can effectively improve the reaction efficiency and utilization of carbon dioxide, and simultaneously reduces the energy consumption needed for the reaction.

In order to achieve the above objectives of the present invention, the following technical schemes are adopted.

The invention provides a reaction system for preparing soda ash, which includes: a carbonization tower, a reaction crystallization tower and a first micro-interface unit. A material outlet is disposed at a bottom of the carbonization tower, and the material outlet is connected to the reaction crystallization tower.

The first micro-interface unit includes a first micro-interface generator and a second micro-interface generator, wherein the first micro-interface generator is disposed below a liquid level in the carbonization tower, the second micro-interface generator is disposed above the first micro-interface generator, and a connecting pipe is disposed between the second micro-interface generator and the first micro-interface generator. The first micro-interface generator is connected with an ammonia gas pipeline and a carbon dioxide pipeline; after ammonia gas and carbon dioxide are dispersed and broken into micron-sized bubbles in the first micro-interface generator, the micron-sized bubbles enter the carbonization tower.

A plurality of baffles is arranged in the carbonization tower from top to bottom, wherein all of the plurality of baffles are staggered and are arranged below the first micro-interface generator.

In the existing technology, the following problems mainly exist when using the "Hou's Soda Ash Production process" to prepare soda ash:

1. In order to ensure reaction efficiency, the outlet pressure of the $CO_2$ compressor should be at least about 0.45 MPaG, which requires high electrical power consumption.

2. The reaction efficiency of each raw material in the carbonization tower is low. It is difficult for the $CO_2$ bubbles to react completely in one pass from bottom to top. Eventually, the $CO_2$ bubbles will gather at the top of the carbonization tower and be mixed with some ammonia gas and be discharged out of the carbonization tower, resulting in a waste of raw materials.

In order to solve the above technical problems, the present invention provides a reaction system for preparing soda ash. Through disposing a reaction crystallization tower behind the carbonization tower in the reaction system, the reaction system can further proceed the reaction in the carbonization tower and improve the conversion rate and reaction efficiency of the carbon dioxide.

Through disposing the first micro-interface unit, the raw materials can be dispersed and broken into micron-sized bubbles at the micron level, thereby increasing the mass transfer area between the gas phase and liquid phase and improving the reaction efficiency and conversion rate of raw materials.

Preferably, the plurality of baffles is disposed obliquely downward in a direction away from a side wall of the carbonization tower. Further, an inclination angle between the baffles and the side wall of the carbonization tower is 30-60°. The baffles are arranged to extend the residence time of the reaction raw materials in the carbonization tower through the blocking effect of the baffles. The reason why the inclination angle between the baffles and the side wall of the carbonization tower is set to 30-60° is that: if the inclination angle is too large, it will cause excessive resistance to the reaction raw materials and affect the flow of the raw material liquid; if the inclination angle is too small, it will not be able to extend the reaction path. The best effect can only be guaranteed by setting the inclination angle to be between 30-60°.

Preferably, a number of the baffles is three, and the three baffles are distributed at equal angles along a circumferential direction of an outer wall of the carbonization tower. Preferably, the uppermost one of the three baffles has an inclination angle of 35°, a middle one of the three baffles has an inclination angle of 45°, and the lowermost one of the three baffles has an inclination angle of 55°. This arrangement can increase the resistance gradient and further extend the flow path, thereby helping to improve the conversion rate of raw materials.

Preferably, a reinforced pipeline is disposed outside the carbonization tower, an inlet of the reinforced pipeline is connected to the side wall of the carbonization tower, and an outlet of the reinforced pipeline is connected to the second micro-interface generator.

The inlet of the reinforced pipeline should be connected to the middle-and-upper part of the carbonization tower. Through the arrangement of the reinforced pipeline, the reaction raw materials within the carbonization tower can form an external circulation, which can extend the reaction path.

At the same time, because the reinforced pipeline continuously sucks the materials in the carbonization tower, a negative pressure zone can be generated in the carbonization tower. The unreacted gas at the top of the carbonization tower is sucked into the liquid in the tower to continue the reaction by using the negative pressure, thereby realizing the recycling of gas above the liquid level in the carbonization tower.

Preferably, a plurality of cleaning pipelines are arranged above the plurality of baffles, a first cleaning outlet and a second cleaning outlet are arranged on each of the plurality of cleaning pipelines, the first cleaning outlets face the baffles and the second cleaning outlets face the side wall of the carbonization tower, and a plurality of inlets of the cleaning pipelines are connected to the reinforced pipeline. Through the arrangement of the cleaning pipelines, the baffles and the inner wall of the carbonization tower can be continuously cleaned to prevent the adhesion of raw materials.

Preferably, the cleaning pipelines are parallel to the baffles. Preferably, an anti-clogging nozzle is disposed in the carbonization tower, an inlet of the anti-clogging nozzle is connected to the reinforced pipeline, and an outlet of the anti-clogging nozzle faces the material outlet. The arrangement of the anti-clogging nozzle can flush the material outlet to prevent it from clogging.

Preferably, the second micro-interface generator is located at a top of the carbonization tower, a gas pipeline is disposed between the carbonization tower and the second micro-interface generator, and gas above the liquid level in the carbonization tower enters the second micro-interface generator through the gas pipeline. During the reaction, the unreacted gas at the top of the carbonization tower is entrained into the second micro-interface generator through the gas pipeline. After the unreacted gas is dispersed and broken by the second micro-interface generator, it returns to the carbonization tower to continue the reaction, which improves the gas conversion rate.

Preferably, a second micro-interface unit is disposed in the reaction crystallization tower, and the second micro-interface unit is connected to the carbon dioxide pipeline. By arranging a second micro-interface unit in the reaction crystallization tower, carbon dioxide can enter the reaction crystallization tower in the form of micron-sized bubbles to react deeply with the sodium chloride solution, which is beneficial to improving the reaction efficiency of raw materials.

Preferably, a stirrer is arranged within the reaction crystallization tower, and the stirrer is arranged above the second micro-interface unit. Through the arrangement of the stirrer, the back-mixing degree of the solution in the reaction crystallization tower can be increased, thereby improving the reaction efficiency.

Preferably, the second micro-interface unit includes a third micro-interface generator and a fourth micro-interface generator, and an outlet of the third micro-interface generator is opposite to an outlet of the fourth micro-interface generator.

Preferably, the third micro-interface generator and the fourth micro-interface generator are respectively disposed on opposite side walls of the reaction crystallization tower, and the stirrer is located between the third micro-interface generator and the fourth micro-interface generator along a horizontal direction.

The reaction system of the present invention mainly includes two reaction sections, which are the first reaction section of the carbonization tower and the second reaction section of the reaction crystallization tower. The reaction crystallization section of the traditional carbonization tower is integrated in the carbonization tower. In the present invention, the reaction crystallization tower is separately disposed. At the same time, carbon dioxide is introduced into the reaction crystallization tower, which effectively promotes the progress of the overall reaction and the utilization rate of raw materials.

In the present invention, a first micro-interface unit is disposed in the carbonization tower. The first micro-interface unit is composed of a first micro-interface generator and a second micro-interface generator. The two micro-interface generators are arranged in an up-and-down direction and are connected with each other through a connecting pipe. The first micro-interface generator mainly disperses and crushes the carbon dioxide and ammonia gas introduced into the carbonization tower, and converts the pressure energy of the gas transported into the carbonization tower or the kinetic energy of the circulating liquid into bubble surface energy and transfers it to the ammonia gas and carbon dioxide, thereby causing ammonia gas and carbon dioxide to break up to form micro-sized bubbles that react with the sodium chloride solution in the carbonization tower. Therefore, the mass transfer area between gas phase and liquid phase is increased, which enhances the mass transfer rate of the reaction within the preset condition range and improves the conversion rate and utilization rate of carbon dioxide. The function of the second micro-interface generator is to entrain the unreacted gas that spilled to the top of the carbonization tower, to re-disperse and re-crush the unreacted gas and then return it to the carbonization tower through the connecting pipe to continue the reaction, thereby improving the conversion rate of raw materials. The micro-bubbles from the second micro-interface generator can be dispersed again after entering the first micro-interface generator through the connecting pipe, thereby improving the distribution uniformity in the liquid raw material. In addition, the arrangement of the connecting pipe can also support the second micro-interface generator, thereby improving the overall structural strength.

A plurality of baffles is also disposed inside the carbonization tower. The baffles of the present invention are multi-layered, preferably three-layered, and have a certain inclination angle. The inclination angles of the three-layer baffles increase sequentially, so that their blocking effects on the reaction materials can be used to extend the residence time in the carbonization tower, thereby improving the conversion rate. At the same time, the positions of the baffles need to be arranged below the first micro-interface unit, because the main reaction zone is actually below the first micro-interface unit. At this time, the micro-bubbles flow out from the second micro-interface generator of the first micro-interface unit and react with water. At the same time, the reaction time is prolonged under the action of the baffles, which is helpful for the full reaction of raw materials.

A second micro-interface unit is disposed inside the reaction crystallization tower of the present invention. The second micro-interface unit is composed of a third micro-interface generator and a fourth micro-interface generator. These two micro-interface generators are respectively arranged on opposite side walls in the reaction crystallization tower and have opposite outlets, which can form a collision flow between these two micro-interface generators and improve the dispersion efficiency. The reaction crystallization tower is also equipped with a stirrer. The stirrer can cooperate with the second micro-interface unit to stir the micro-bubbles to improve their dispersion uniformity in the liquid in the reaction crystallization tower and further improve the reaction effect. As can be seen that, by specifically designing the position and the number of the micro-interface generators, and by combining it with a stirrer in the present invention, the application effect can be improved.

Those skilled in the art can understand that the micro-interface generators used in the present invention have been disclosed in the inventor's earlier patents, such as application numbers CN201610641119.6, CN201610641251.7, CN201710766435.0, CN106187660, CN105903425A, CN109437390A, CN205833127U and CN207581700U. The earlier patent CN201610641119.6 introduces in detail the specific product structure and working principle of the micron bubble generator (i.e., the micro-interface generator). The application document says that: "the micron bubble generator includes a body and a secondary crushing member. The body has a cavity, and the body is provided with an inlet connected to the cavity. Opposite first end and second end of the cavity are both open, wherein the cross-sectional area of the cavity decreases from the middle of the cavity to the first end and the second end of the cavity. The secondary crushing member is disposed on at least one of the first end and the second end of the cavity. A part of the secondary crushing member is arranged in the cavity, and an annular channel is formed between the secondary crushing member and open through holes at both ends of the cavity. The micron bubble generator also includes an air inlet pipe and a liquid inlet pipe." From the specific structure disclosed in the application document, we can know that its specific working principle is that: the liquid enters the micron bubble generator tangentially through the liquid inlet pipe, rotates and cut the gas at ultra-high speed, and breaks the gas bubbles into micron-level micro-bubbles. Hence, the mass transfer area between the liquid phase and the gas phase is increased, and the micron bubble generator in this patent is a pneumatic micro-interface generator.

In addition, it is recorded in the previous patent CN201610641251.7 that: a primary bubble breaker has a circulating liquid inlet, a circulating gas inlet and a gas-liquid mixture outlet, and a secondary bubble breaker connects a feed inlet with the gas-liquid mixture outlet, indicating that the bubble breaker requires a mixture of gas and liquid to enter. Furthermore, it can be seen from the following figures that the primary bubble breaker mainly uses circulating fluid as power. In fact, the primary bubble breaker is a hydraulic micro-interface generator. The secondary bubble breaker is to simultaneously pass the gas-liquid mixture into an elliptical rotating ball and rotate it, thereby achieving bubble crushing during the rotation. Therefore, the secondary bubble breaker is actually a gas-liquid linkage micro-interface generator. In fact, no matter it is a hydraulic micro-interface generator or a gas-liquid linkage micro-interface generator, they all belong to a specific form of micro-interface generators. However, the micro-interface generator used in the present invention is not limited to the above-mentioned forms. The specific structure of the bubble breaker recorded in the earlier patent is merely one form of the micro-interface generators adopted in the present invention.

In addition, the earlier patent CN 201710766435.0 records that: "the principle of the bubble breaker is high-speed flow to achieve mutual collision of gases", and also explains that it can be used in micro-interface strengthening reactors to verify the correlation between the bubble breaker and the micro-interface generator. Moreover, the earlier patent CN106187660 also has relevant records on the specific structure of the bubble breaker. For details, see paragraphs [0031]-[0041] of the specification and the drawings. It has a detailed explanation of the specific working principle of the bubble breaker S-2. The top of the bubble breaker is a liquid phase inlet, and the side is a gas phase inlet. The liquid phase coming in form the top provides entrainment power to achieve the effect of crushing into ultra-fine bubbles. As can be seen from the attached figure that, the bubble breaker has a conical structure, and the diameter of the upper part is larger than the diameter of the lower part, which is also to provide better entrainment power for the liquid phase.

Since the micro-interface generator had just been developed during the initial stages of the earlier patent applications, it was initially named micron bubble generator (CN201610641119.6), bubble breaker (CN 201710766435.0), etc. With continuous technological improvements, the name was later changed to micro-interface generator. Now the micro-interface generator in the present invention is equivalent to the earlier micro bubble generator, bubble breaker, etc., but the names are different. In summary, the micro-interface generator of the present invention belongs to the prior art.

Preferably, a back-mixing pipeline is arranged outside the reaction crystallization tower; an inlet of the back-mixing pipeline is connected to the side wall of the reaction crystallization tower, and an outlet of the back-mixing pipeline is connected to the bottom of the reaction crystallization tower. Through the arrangement of the back-mixing pipeline, the back-mixing degree of the reaction liquid in the reaction crystallization tower can be increased, which can prevent the crystallization blockage at the bottom of the reaction crystallization tower and improve the conversion rate and use rate of carbon dioxide.

Preferably, the reaction system further includes a filter, a calcining tower and a mother liquor storage tank. The reaction crystallization tower is connected to the filter. After a reaction product of the reaction crystallization tower is filtered by the filter, a liquid phase enters the mother liquor storage tank, and a solid phase enters the calcining tower. A product conveyor is disposed at a bottom of the calcining tower.

Preferably, the top of the carbonization tower is provided with a raw material feeding pipeline for feeding a sodium chloride solution and a tail gas scrubbing tower. The sodium chloride solution in the raw material feeding pipeline is sent into the carbonization tower through the tail gas scrubbing tower.

Preferably, the ammonia gas pipeline is connected to an ammonia gas preparation unit. The ammonia gas preparation unit includes an air separator, a hydrogen synthesizer and an ammonia synthesizer, and the air separator and the hydrogen synthesizer are both connected to the ammonia synthesizer.

Preferably, the carbon dioxide pipeline is connected to a carbon dioxide storage tank, and the carbon dioxide storage tank is connected to a flue gas unit for providing carbon dioxide. The flue gas unit can be IGCC flue gas. In actual use, the tail gas from the steam turbine or gas turbine can be desulfurized and denitrified and then input into the carbon dioxide storage tank.

Preferably, the hydrogen synthesizer is connected to the carbon dioxide storage tank.

Preferably, a tail gas outlet of the calcining tower is connected to a condenser, a liquid phase outlet of the condenser is connected to the tail gas scrubbing tower, and a gas phase outlet of the condenser is connected to the carbon dioxide storage tank.

The present invention also provides a reaction method for preparing soda ash, which uses the above reaction system to prepare soda ash.

Preferably, the reaction method includes the following steps: dispersing and crushing ammonia gas and carbon dioxide into micron-level micro-bubbles through using the first micro-interface unit, and then mixing micron-level micro-bubbles with water to react to generate ammonium bicarbonate; reacting ammonium bicarbonate with sodium chloride to generate sodium bicarbonate; heating and decomposing sodium bicarbonate to produce soda ash.

Preferably, the delivery pressure of carbon dioxide is 0.03-0.18 MPaG.

Compared with the prior art, the beneficial effects of the present invention are:

(1) The reaction system of the present invention effectively improves the reaction efficiency and the conversion rate of raw materials by the arrangement of a carbonization tower and a reaction crystallization tower, and by arranging a first micro-interface unit and a second micro-interface unit, respectively.

(2) After the traditional carbonization reaction process is changed into the micro-interface enhanced carbonization process (referred to as MIR-H) in the present invention, $CO_2$ can enter from the top of the micro-interface enhanced carbonization tower, and then be emulsified through the micro-interface and sent directly to the bottom of the carbonization tower. In this way, the transportation pressure of $CO_2$ can be reduced from 0.45-0.46 MPaG to less than 0.18 MPaG. In addition, the $CO_2$ that originally entered from the bottom of the reactor was only one-way reaction, the $CO_2$ can be converted into a two-way reaction. Under the same reaction conditions, the conversion rate and utilization rate of $CO_2$ are improved.

(3) The reaction raw materials of the present invention are low-carbon and environmentally friendly. The ammonia raw material can be green ammonia or blue ammonia, and $CO_2$ can use low-concentration $CO_2$ of 70% or less as the raw material. For example, $CO_2$ from IGCC flue gas can be used as the carbon source, or it is also possible to mix the recovered $CO_2$ with a concentration of 75-80% from the calciner and the low-concentration $CO_2$ of the flue gas to form the $CO_2$ with a concentration of 50-75% as the carbon source. In this way, the production process of the present invention becomes a carbon-negative production process, thereby reducing production costs.

BRIEF DESCRIPTION OF THE DRAWINGS

Various other advantages and benefits will become clear to those of ordinary skill in the art upon reading the following detailed description of the preferred embodiments. The drawings are for the purpose of illustrating preferred embodiments only and are not to be construed as limiting the present invention. Also, throughout the drawings, the same reference signs are used to appoint the same components. In the drawings.

Herein:

| 10 | carbonization tower; | 101 | material outlet; |
|---|---|---|---|
| 102 | anti-clogging nozzle; | 103 | baffle; |
| 104 | cleaning pipeline; | 1041 | second cleaning outlet; |
| 1042 | first cleaning outlet; | 105 | first micro-interface generator; |
| 106 | connecting pipe; | 107 | second micro-interface generator; |
| 108 | gas pipeline; | 20 | reaction crystallization tower; |
| 201 | third micro-interface generator; | 202 | fourth micro-interface generator; |
| 203 | stirrer; | 204 | back-mixing pipeline; |
| 30 | tail gas scrubbing tower; | 40 | raw material feeding pipeline; |
| 50 | reinforced pipeline; | 60 | ammonia gas pipeline; |

-continued

| 70 | carbon dioxide pipeline; | 80 | condenser; |
| 90 | filter; | 100 | mother liquor storage tank; |
| 110 | calcining tower; | 120 | product conveyor; |
| 130 | high-temperature gas channel; | 140 | carbon dioxide storage tank; |
| 150 | gas turbine; | 160 | steam turbine; |
| 170 | hydrogen synthesizer; | 180 | ammonia synthesizer; |
| 190 | air separator. | | |

DESCRIPTION OF THE PREFERRED EMBODIMENTS

The schemes of the present invention will be clearly and completely described below in conjunction with the accompanying drawings and specific embodiments. However, those skilled in the art will understand that the following described embodiments are some of the embodiments of the present invention, rather than all of them. They are only used to illustrate the present invention and should not be regarded as limiting the scope of the present invention. Based on the embodiments of the present invention, all other embodiments obtained by those of ordinary skill in the art without creative efforts fall within the scope of the protection of the present invention. If the specific conditions are not specified in the embodiments, the conditions should be conducted according to the conventional conditions or the conditions recommended by the manufacturer. If the manufacturer of the reagents or instruments used is not indicated, they are all conventional products that can be purchased commercially.

In the description of the present invention, it should be noted that, the indicated orientation or positional relationship of the terms such as "center", "upper", "lower", "left", "right", "vertical", "horizontal", "inner", "outer" is based on the orientation or positional relationship shown in the accompanying drawings. It is only for the convenience of describing the present invention and simplifying the description, rather than showing or implying that the referred device or element must have a specific orientation or must be constructed and operated in a particular orientation. Therefore, it should not be construed as a limitation of the present invention. Furthermore, the terms "first", "second and "third" are used for descriptive purposes only and are not to be construed as indicating or implying relative importance.

In the description of the present invention, it should be noted that, unless otherwise clearly stated and limited, the terms "installation", "connecting" and "connection" should be understood in a broad sense. For example, it can be a fixed connection, a detachable connection, or an integral connection. It can be a mechanical connection or an electrical connection. It can be a direct connection or an indirect connection through an intermediate medium, or an internal connection between two components. For those of ordinary skill in the art, the specific meanings of the above terms in the present invention can be understood on a case-by-case basis.

In order to explain the technical schemes in the present invention more clearly, the following description will be made in the form of specific embodiments.

Embodiment 1

Referring to FIG. 1-FIG. 4. A reaction system for preparing soda ash is provided in this embodiment, which includes: a carbonization tower 10, a reaction crystallization tower 20 and a first micro-interface unit. A material outlet 101 is disposed at the bottom of the carbonization tower 10, and the material outlet 101 is connected to the reaction crystallization tower 20.

Figure 2:
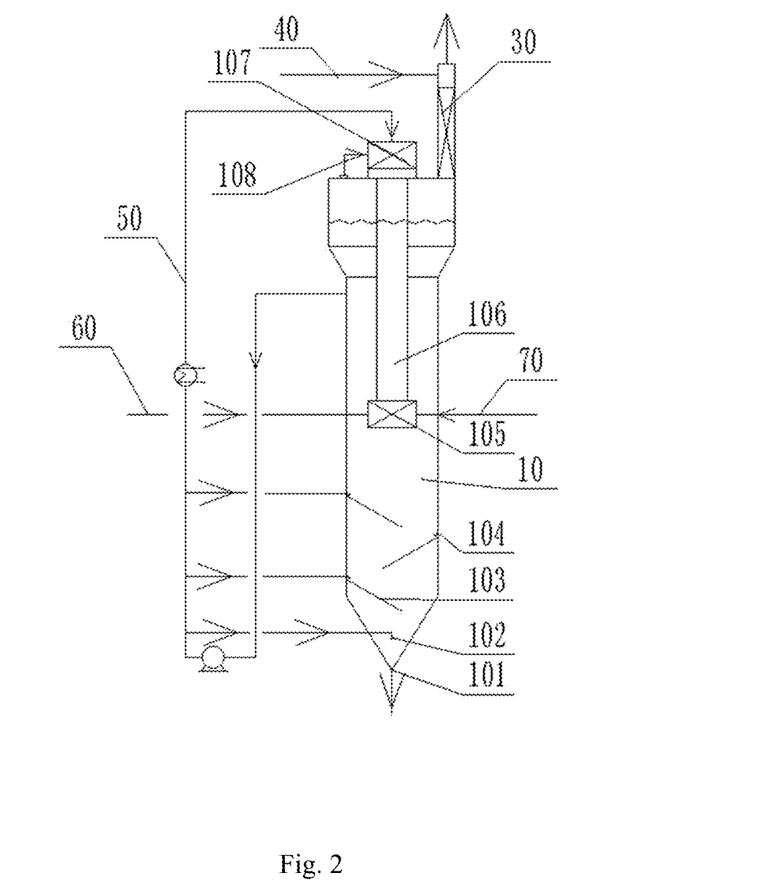
FIG. 2 is a schematic structural diagram of the carbonization tower provided in Embodiment 1 of the present invention.

As shown in FIG. 2, the first micro-interface unit includes a first micro-interface generator 105 and a second micro-interface generator 107. The first micro-interface generator 105 is disposed below the liquid level in the carbonization tower 10, the second micro-interface generator 107 is disposed above the first micro-interface generator 105, and a connecting pipe 106 is disposed between the second micro-interface generator 107 and the first micro-interface generator 105. The first micro-interface generator 105 is connected to an ammonia gas pipeline 60 and a carbon dioxide pipeline 70. After the ammonia gas and carbon dioxide are dispersed and broken into micron-sized bubbles in the first micro-interface generator 105, micron-sized bubbles enter the carbonization tower 10.

In this embodiment, the second micro-interface generator 107 is located at the top of the carbonization tower 10. A gas pipeline 108 is disposed between the carbonization tower 10 and the second micro-interface generator 107. The gas above the liquid level in the carbonization tower 10 enters the second micro-interface generator 107 through the gas pipeline 108. During the reaction, the unreacted gas at the top of the carbonization tower 10 is entrained into the second micro-interface generator 107 through the gas pipeline 108, is dispersed and broken by the second micro-interface generator 107, and is then returned to the carbonization tower 10 to continue the reaction, thereby improving the gas conversion rate.

A reinforced pipeline 50 is disposed outside the carbonization tower 10. The inlet of the reinforced pipeline 50 is connected to the side wall of the carbonization tower 10, and the outlet of the reinforced pipeline 50 is connected to the second micro-interface generator 107. The inlet of the reinforced pipeline 50 should be connected to the middle-and-upper part of the carbonization tower 10. Through the arrangement of the reinforced pipeline 50, the reaction raw materials within the carbonization tower 10 can form an external circulation and extend the reaction path. At the same time, since the reinforced pipeline 50 continuously sucks the materials in the carbonization tower 10, a negative pressure zone can be generated in the carbonization tower 10. The unreacted gas at the top of the carbonization tower 10 is sucked into the liquid in the carbonization tower 10 to continue the reaction by using the negative pressure, thereby realizing the recycling of gas above the liquid surface in the carbonization tower 10.

The top of the carbonization tower 10 is provided with a raw material feeding pipeline 40 for feeding sodium chloride solution and a tail gas scrubbing tower 30. The sodium chloride solution in the raw material feeding pipeline 40 is sent to the carbonization tower 10 through the tail gas scrubbing tower 30.

Please continue to refer to FIG. 2. Multiple layers of baffles 103 are disposed in the carbonization tower 10 from top to bottom. The multi-layer baffles 103 are staggered and are all disposed below the first micro-interface generator 105. A plurality of cleaning pipelines 104 are arranged above the plurality of baffles 103, and a first cleaning outlet 1042 and a second cleaning outlet 1041 are arranged on each of the plurality of cleaning pipelines. The first cleaning outlets 1042 face the baffles 103, the second cleaning outlets 1041 face the side walls of the carbonization tower, and the inlets of the cleaning pipelines 104 are connected to the reinforced pipeline 50.

Specifically, the baffles 103 are disposed obliquely downward in a direction away from the side wall of the carbonization tower 10, and the cleaning pipelines 104 are parallel to the baffles 103. Further, an inclination angle between the baffles 103 and the side wall of the carbonization tower 10 can be 30-60°.

Figure 3:
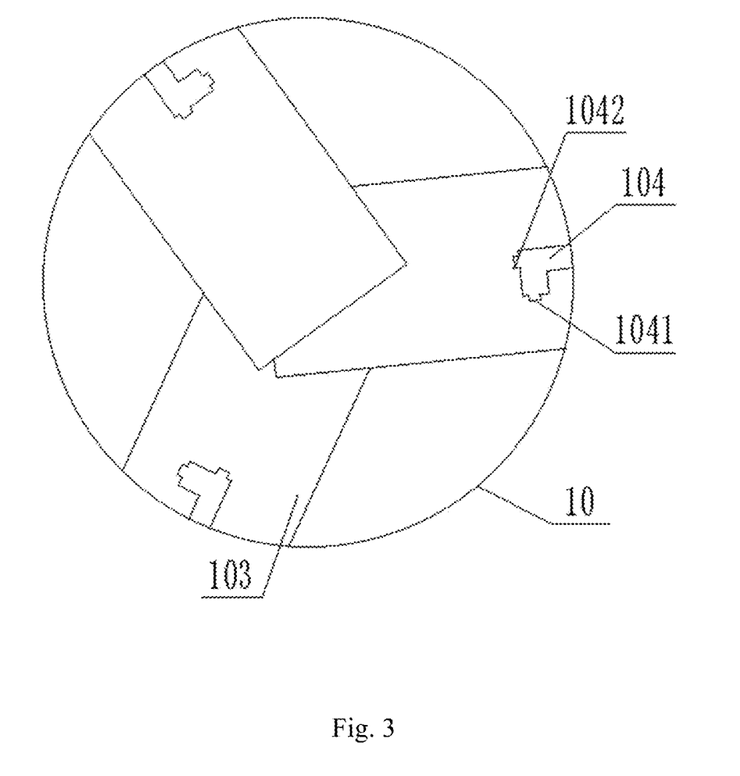
FIG. 3 is a schematic structural diagram of the baffle plate in the carbonization tower along the top view direction in Embodiment 1 of the present invention.

As shown in FIG. 3, in this embodiment, the number of the baffles 103 is three, and the three baffles 103 are distributed at equal angles along the circumferential direction on the outer wall of the carbonization tower 10. The uppermost one of the three baffles 103 has an inclination angle of 35°, a middle one of the three baffles 103 has an inclination angle of 45°, and the lowermost one of the three baffles 103 has an inclination angle of 55°. This arrangement can increase the resistance gradient and further extend the flow path, thereby helping to improve the conversion rate of raw materials.

In order to prevent the material outlet 101 from clogging, an anti-clogging nozzle 102 is disposed in the carbonization tower 10. An inlet of the anti-clogging nozzle 102 is connected to the reinforced pipeline 50, and an outlet of the anti-clogging nozzle 102 faces the material outlet 101.

Figure 4:
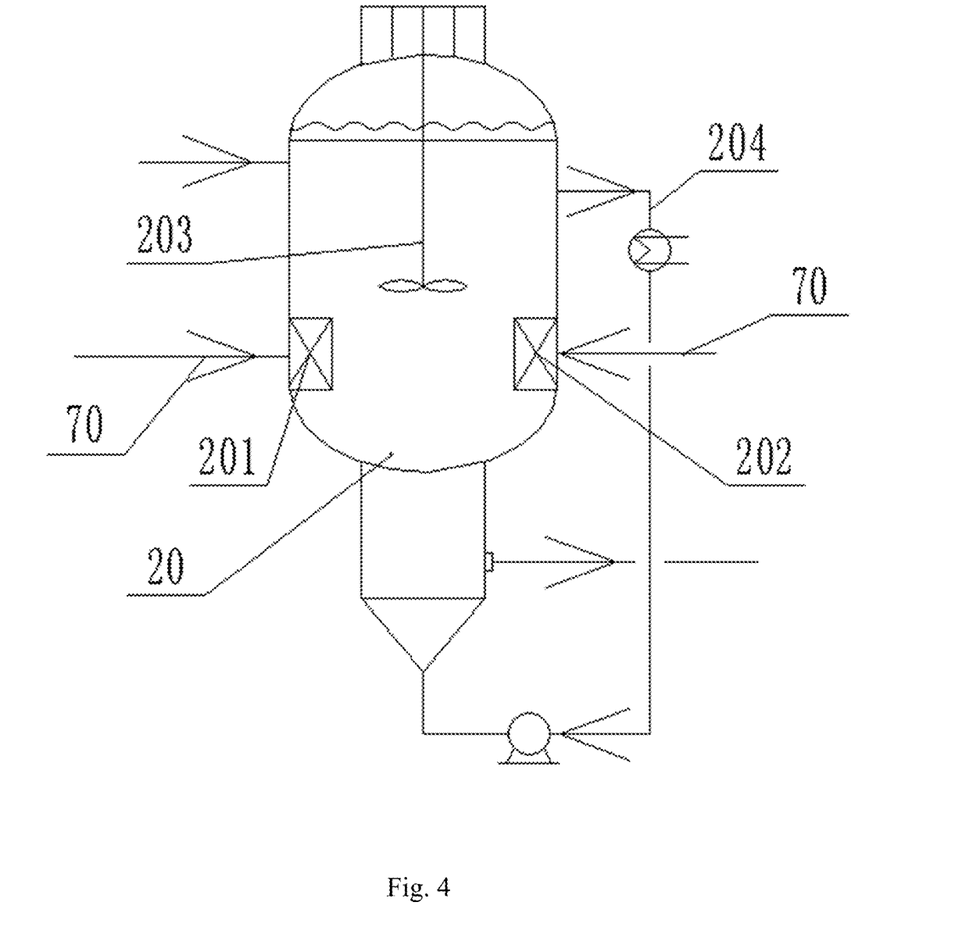
FIG. 4 is a schematic structural diagram of the reaction crystallization tower provided in Embodiment 1 of the present invention.

As shown in FIG. 4, a second micro-interface unit is disposed in the reaction crystallization tower 20, and the second micro-interface unit is connected to the carbon dioxide pipeline 70. By disposing the second micro-interface unit in the reaction crystallization tower 20, carbon dioxide can enter the reaction crystallization tower 20 in the form of micro bubbles to react deeply with the sodium chloride solution, which is beneficial to improving the reaction efficiency of raw materials.

The reaction crystallization tower 20 is also equipped with a stirrer 203, and the stirrer 203 is disposed above the second micro-interface unit. Through the arrangement of the stirrer 203, the back-mixing degree of the solution in the reaction crystallization tower 20 can be increased, thereby improving the reaction efficiency. The second micro-interface unit includes a third micro-interface generator 201 and a fourth micro-interface generator 202. The outlet of the third micro-interface generator 201 is opposite to the outlet of the fourth micro-interface generator 202.

Specifically, the third micro-interface generator 201 and the fourth micro-interface generator 202 are respectively disposed on opposite side walls of the reaction crystallization tower 20, and the stirrer 203 is located between the third micro-interface generator 201 and the fourth micro-interface generator 202 along the horizontal direction.

A back-mixing pipeline 204 is arranged outside the reaction crystallization tower 20; an inlet of the back-mixing pipeline 204 is connected to the side wall of the reaction crystallization tower 20, and an outlet of the back-mixing pipeline 204 is connected to the bottom of the reaction crystallization tower 20. During the using of the back-mixing pipeline 204, the back-mixing degree of the reaction liquid in the reaction crystallization tower 20 can be increased, which can prevent the crystallization blockage at the bottom of the reaction crystallization tower 20 and improve the conversion rate and utilization rate of carbon dioxide.

Figure 1:
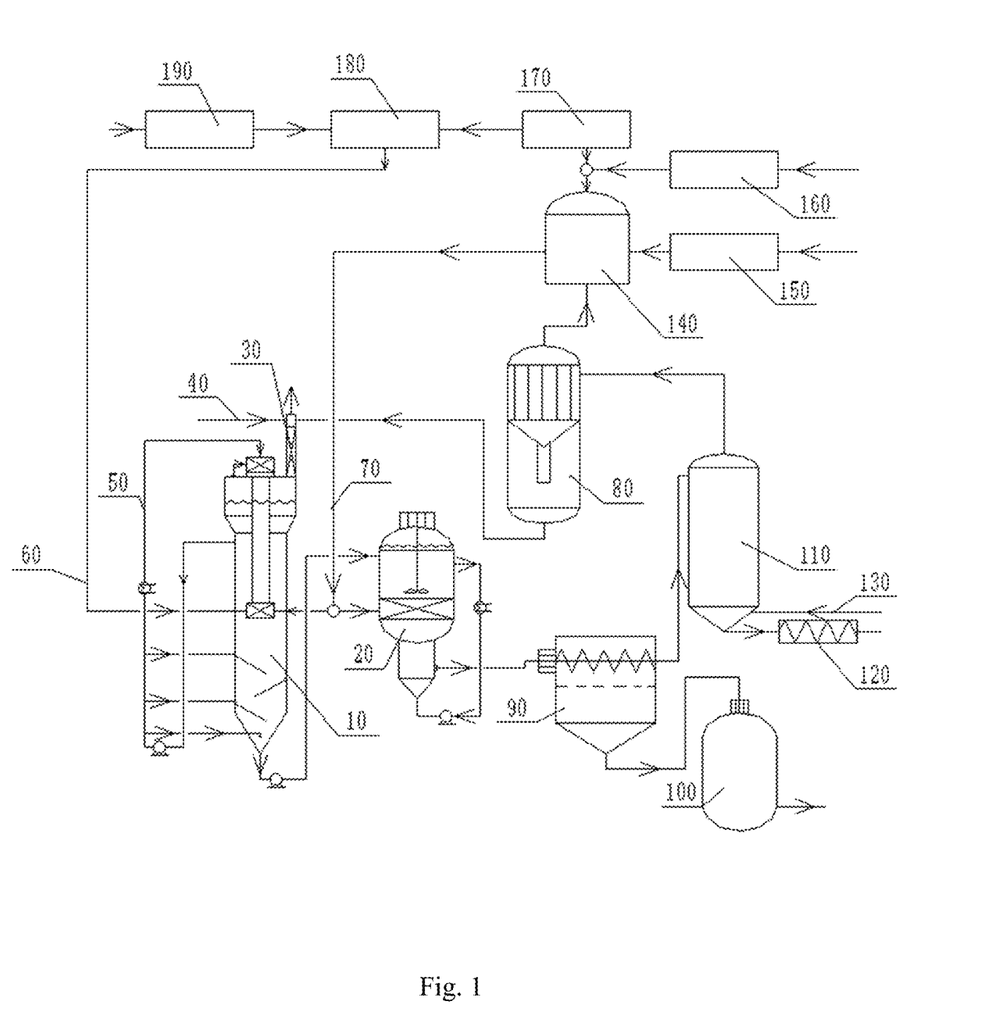
FIG. 1 is a schematic structural diagram of the reaction system provided in Embodiment 1 of the present invention.

As shown in FIG. 1, the reaction system of this embodiment further includes a filter 90, a calcining tower 110 and a mother liquor storage tank 100. The reaction crystallization tower 20 is connected to the filter 90. After a reaction product of the reaction crystallization tower 20 is filtered by the filter 90, a liquid phase enters the mother liquor storage tank 100, and a solid phase enters the calcining tower 110. A product conveyor 120 is disposed at a bottom of the calcining tower 110. A high-temperature gas channel 130 for providing high-temperature carbon dioxide to the calcining tower 110 is connected to the side wall of the calcining tower 110.

The filter 90 is provided with a filter medium for separating solid and liquid, and a screw conveyor for outputting the filter residue is disposed above the filter medium.

In this embodiment, the ammonia gas pipeline 60 is connected to an ammonia preparation unit. The ammonia preparation unit includes an air separator 190, a hydrogen synthesizer 170 and an ammonia synthesizer 180. The air separator 190 and the hydrogen synthesizer 170 are both connected to the ammonia synthesizer 180. The hydrogen synthesizer 170 is also connected to the carbon dioxide storage tank 140. Natural gas and water are reacted in the hydrogen synthesizer 170, and the generated carbon dioxide is input into the carbon dioxide storage tank 140. The generated hydrogen enters the ammonia synthesizer 180, and then hydrogen and the nitrogen separated by the air separator 190 are used to generate ammonia gas. The separation method of carbon dioxide and hydrogen generated from hydrogen synthesis gas can adopt the membrane separation method commonly used in this field.

The carbon dioxide pipeline 70 is connected to the carbon dioxide storage tank 140, the carbon dioxide storage tank 140 is connected to a flue gas unit for providing carbon dioxide. The flue gas unit may be IGCC flue gas. In actual use, the tail gas from the steam turbine 160 or the gas turbine 150 may be desulfurized and denitrified and then input into the carbon dioxide storage tank 140. When the carbon dioxide from the steam turbine 160 is used, it can be mixed with the carbon dioxide produced in the hydrogen synthesizer 170 to make the concentration of the carbon dioxide meet the standard. When the carbon dioxide from the gas turbine 150 is used, it can be used directly due to its high concentration of carbon dioxide.

In this embodiment, the tail gas outlet of the calcining tower 110 is connected to a condenser 80, a liquid phase outlet of the condenser 80 is connected to the tail gas scrubbing tower 30, and a gas phase outlet of the condenser 80 is connected to the carbon dioxide storage tank 140.

A reaction method of the reaction system in this embodiment is as follows: dispersing and breaking ammonia and carbon dioxide into micro-level micro-bubbles through the micro-interface, and then mixing the micro-bubbles with water in the carbonization tower 10 to react to generate ammonium bicarbonate; reacting ammonium bicarbonate with sodium chloride to generate sodium bicarbonate; the crude sodium bicarbonate product entering the reaction crystallization tower 20, and feeding carbon dioxide through the second micro-interface unit and continuing to react with unreacted raw materials in the crude product; the reaction product entering the filter 90 for filtration, and the liquid entering the mother liquor storage tank 100, and then obtaining the ammonium chloride product through traditional separation (specifically, sodium chloride can be added to the mother liquor to precipitate ammonium chloride, and the remaining sodium chloride solution can be reused as reaction raw materials for reuse); the filter residue entering the calcining tower 110, where the sodium bicarbonate is thermally decomposed to obtain soda ash, which is output through the product conveyor 120. Condensing and separating the carbon dioxide and water produced by calcination by the condenser 80, and then sending the separated water to the carbonization tower 10 through the tail gas scrubbing tower 30 and sending the separated carbon dioxide to the carbon dioxide storage tank 140.

Embodiment 2

The only difference between this Embodiment 2 and Embodiment 1 is that: the inclination angles of the baffles in the carbonization tower are all 45°.

Embodiment 3

The only difference between this Embodiment 3 and Embodiment 1 is that: the second micro-interface generator is not disposed.

Embodiment 4

The only difference between this Embodiment 4 and Embodiment 1 is that: the inclination angles of the baffles in the carbonization tower are all 10°.

Comparative Example 1

The only difference between this Comparative Example 1 and Embodiment 1 is that: no baffles are disposed in the carbonization tower.

Experimental Example 1 The reaction systems of Embodiments 1-4 and Comparative Example 1 are respectively used to produce soda ash. The specific experimental conditions are as follows: sodium chloride solution enters the reactor, wherein the feed volume is 1.08 m3/h, the temperature is 38~42° C., and the pressure is 0.4 MPaG. The inlet air containing 75%~85% $CO_2$ enters the micro-interface unit at the upper part of the tower, wherein the feed volume is about 21 Nm3/h, the temperature is 30-50° C., and the pressure is 0.08 MPaG. The reaction temperature within the carbonization tower is 50° C. The sodium bicarbonate production intensity in the product output from the reaction crystallization tower and the concentration of $CO_2$ in the tail gas discharged from the tail gas scrubbing tower are tested. The test results are as follows.

TABLE 1

Test Results

| | Sodium bicarbonate production intensity (kg/m³ · h) | Concentration of $CO_2$ in tail gas (%) |
|---|---|---|
| Embodiment 1 | 70 | 2.3 |
| Embodiment 2 | 67 | 2.5 |
| Embodiment 3 | 65 | 4.5 |
| Embodiment 4 | 62 | 3.8 |
| Comparative Example 1 | 60 | 4.1 |
| Existing Process | 58.3 | 8-20 |

In the existing technology, when using the ""Hou's Soda Ash Production Process" to prepare soda ash, the sodium bicarbonate production intensity is usually 58.3 kg/m3 h, the concentration of $CO_2$ in the tail gas is generally 8-20%, and the power consumption per ton of product is 12.19 kW h/t. As can be seen from Table 1, compared with the existing carbonization tower, the sodium bicarbonate production intensity of each Embodiment of the present invention has increased significantly, and the sodium bicarbonate production intensity of Embodiment 1 has increased by 20%. The concentration of $CO_2$ in the tail gas of the reaction system in each embodiment of the present invention is lower than 5%, which is 37.5-75% lower than the existing process. Moreover, since the input pressure of carbon dioxide in this embodiment only requires 0.08 MPaG, the power consumption per ton of product is also reduced by 33.3-11.2% compared to the existing process.

Comparing the data of Embodiment 1, Embodiment 2, Embodiment 4 with the data of Comparative Example 1, it can be found that the test result parameters of Embodiment 1 are all optimal, indicating that the optimal reaction effect can be achieved when arrangement of the baffles in Embodiment 1 is adopted. The experimental effects of Embodiment 4 and Comparative Example are not much different, which shows that when the inclination angles of the baffles are too small, it basically cannot achieve the effect of extending the reaction path.

Comparing Embodiment 1 with Embodiment 3, it can be found that, the concentration of $CO_2$ in the tail gas of Embodiment 1 is significantly lower that that of Embodiment 3, indicating that Embodiment 1 achieves capture of $CO_2$ by disposing a second micro-interface generator and improves the conversion rate of $CO_2$.

In short, compared with the existing process, the reaction system for preparing soda ash of the present invention can effectively improve the reaction efficiency of raw materials and the utilization rate of carbon dioxide, which reduces the input pressure of carbon dioxide, thereby effectively saving energy consumption.

Finally, it should be noted that the above embodiments are merely used to illustrate the technical schemes of the present invention, rather than to limit the present invention. Although the present invention has been described in detail with reference to the above-mentioned embodiments, those of ordinary skill in the art should understand that they can still modify the technical schemes recorded in the above-mentioned embodiments or make equivalent substitutions for some or all of the technical features. However, these modifications or substitutions do not cause the essence of the corresponding technical scheme to depart from the scope of the technical scheme of each embodiment of the present invention.

What is claimed is:

1. A reaction system for preparing soda ash, characterized in that, comprising:
   a carbonization tower, a reaction crystallization tower and a first micro-interface unit;
   a material outlet is disposed at a bottom of the carbonization tower, and the material outlet is connected to the reaction crystallization tower;
   the first micro-interface unit comprises a first micro-interface generator and a second micro-interface generator, wherein the first micro-interface generator is disposed below a liquid level in the carbonization tower, the second micro-interface generator is disposed above the first micro-interface generator, and a connecting pipe is disposed between the second micro-interface generator and the first micro-interface generator;
   the first micro-interface generator is connected with an ammonia gas pipeline and a carbon dioxide pipeline; after ammonia gas and carbon dioxide are dispersed and broken into micron-sized bubbles in the first micro-interface generator, the micron-sized bubbles enter the carbonization tower;
   a plurality of baffles is arranged in the carbonization tower from top to bottom, wherein all of the plurality of baffles are staggered and are arranged below the first micro-interface generator;
   wherein the plurality of baffles are disposed obliquely downward in a direction away from a side wall of the carbonization tower; wherein a number of the baffles is three, and the three baffles are distributed at equal angles along a circumferential direction of an outer wall of the carbonization tower; wherein an uppermost one of the three baffles has an inclination angle of 35°, a middle one of the three baffles has an inclination angle of 45°, and a lowermost one of the three baffles has an inclination angle of 55°;

wherein a reinforced pipeline is disposed outside the carbonization tower, an inlet of the reinforced pipeline is connected to the side wall of the carbonization tower, and an outlet of the reinforced pipeline is connected to the second micro-interface generator;

wherein the second micro-interface generator is located at a top of the carbonization tower, a gas pipeline is disposed between the carbonization tower and the second micro-interface generator, and gas above the liquid level in the carbonization tower enters the second micro-interface generator through the gas pipeline.

2. The reaction system for preparing soda ash according to claim 1, characterized in that, wherein a plurality of cleaning pipelines are arranged above the plurality of baffles, a first cleaning outlet and a second cleaning outlet are arranged on each of the plurality of cleaning pipelines, the first cleaning outlets face the baffles and the second cleaning outlets face the side wall of the carbonization tower, and a plurality of inlets of the cleaning pipelines are connected to the reinforced pipeline.

3. The reaction system for preparing soda ash according to claim 2, characterized in that, wherein the cleaning pipelines are parallel to the baffles.

4. The reaction system for preparing soda ash according to claim 1, characterized in that, wherein an anti-clogging nozzle is disposed in the carbonization tower, an inlet of the anti-clogging nozzle is connected to the reinforced pipeline, and an outlet of the anti-clogging nozzle faces the material outlet.

5. The reaction system for preparing soda ash according to claim 1, characterized in that, wherein a second micro-interface unit is disposed in the reaction crystallization tower, and the second micro-interface unit is connected to the carbon dioxide pipeline.

6. The reaction system for preparing soda ash according to claim 5, characterized in that, wherein a stirrer is arranged within the reaction crystallization tower, and the stirrer is arranged above the second micro-interface unit.

7. The reaction system for preparing soda ash according to claim 6, characterized in that, wherein the second micro-interface unit comprises a third micro-interface generator and a fourth micro-interface generator, and an outlet of the third micro-interface generator is opposite to an outlet of the fourth micro-interface generator.

8. The reaction system for preparing soda ash according to claim 7, characterized in that, wherein the third micro-interface generator and the fourth micro-interface generator are respectively disposed on opposite side walls of the reaction crystallization tower, and the stirrer is located between the third micro-interface generator and the fourth micro-interface generator along a horizontal direction.

9. The reaction system for preparing soda ash according to claim 1, characterized in that, wherein a back-mixing pipeline is arranged outside the reaction crystallization tower; an inlet of the back-mixing pipeline is connected to the side wall of the reaction crystallization tower, and an outlet of the back-mixing pipeline is connected to the bottom of the reaction crystallization tower.

10. The reaction system for preparing soda ash according to claim 1, characterized in that, further comprising:
a filter, a calcining tower and a mother liquor storage tank;
the reaction crystallization tower is connected to the filter;
after a reaction product of the reaction crystallization tower is filtered by the filter, a liquid phase enters the mother liquor storage tank, and a solid phase enters the calcining tower; a product conveyor is disposed at a bottom of the calcining tower.

11. The reaction system for preparing soda ash according to claim 10, characterized in that, wherein the top of the carbonization tower is provided with a raw material feeding pipeline for feeding a sodium chloride solution and a tail gas scrubbing tower; the sodium chloride solution in the raw material feeding pipeline is sent into the carbonization tower through the tail gas scrubbing tower.

12. The reaction system for preparing soda ash according to claim 11, characterized in that, wherein the ammonia gas pipeline is connected to an ammonia gas preparation unit; the ammonia gas preparation unit comprises an air separator, a hydrogen synthesizer and an ammonia synthesizer, and the air separator and the hydrogen synthesizer are both connected to the ammonia synthesizer.

13. The reaction system for preparing soda ash according to claim 12, characterized in that, wherein the carbon dioxide pipeline is connected to a carbon dioxide storage tank, and the carbon dioxide storage tank is connected to a flue gas unit for providing carbon dioxide.

14. The reaction system for preparing soda ash according to claim 13, characterized in that, wherein the hydrogen synthesizer is connected to the carbon dioxide storage tank.

15. The reaction system for preparing soda ash according to claim 14, characterized in that, wherein a tail gas outlet of the calcining tower is connected to a condenser, a liquid phase outlet of the condenser is connected to the tail gas scrubbing tower, and a gas phase outlet of the condenser is connected to the carbon dioxide storage tank.

* * * * *